(12) United States Patent
Booth et al.

(10) Patent No.: US 8,719,101 B1
(45) Date of Patent: May 6, 2014

(54) SYSTEM AND METHOD OF ON-LINE ADVERTISING

(75) Inventors: Timothy L. Booth, Murphy, TX (US); Shawn Sandifer, Frisco, TX (US)

(73) Assignee: COR, Inc., Plano, TX (US)

( * ) Notice: Subject to any disclaimer, the term of this patent is extended or adjusted under 35 U.S.C. 154(b) by 485 days.

(21) Appl. No.: 12/731,973

(22) Filed: Mar. 25, 2010

Related U.S. Application Data

(60) Provisional application No. 61/163,132, filed on Mar. 25, 2009.

(51) Int. Cl.
*G06Q 10/00* (2012.01)

(52) U.S. Cl.
USPC ...................................................... 705/14.73

(58) Field of Classification Search
USPC ...................................................... 705/14.73
See application file for complete search history.

(56) References Cited

U.S. PATENT DOCUMENTS

| | | | |
|---|---|---|---|
| 6,496,857 B1* | 12/2002 | Dustin et al. .................. | 709/219 |
| 2003/0212745 A1* | 11/2003 | Caughey ........................ | 709/206 |
| 2006/0149630 A1* | 7/2006 | Elliott et al. ..................... | 705/14 |
| 2008/0040219 A1* | 2/2008 | Kim et al. ........................ | 705/14 |
| 2011/0246593 A1* | 10/2011 | Crespo et al. .................. | 709/206 |

* cited by examiner

*Primary Examiner* — Naresh Vig
(74) *Attorney, Agent, or Firm* — Haynes and Boone, LLP

(57) ABSTRACT

A system and method according to which an advertisement associated with a first party that contains an interactive element displayed within the advertisement is displayed to a recipient in a network communication associated with a second party, an interface option within the advertisement is displayed as a result of an interaction by the recipient with the interactive element, contact information in the interface option is received from the recipient, and the contact information is stored in a database.

4 Claims, 5 Drawing Sheets

SYSTEM AND METHOD OF ON-LINE ADVERTISING

CROSS REFERENCE TO RELATED APPLICATIONS

This application claims the benefit of the filing date of U.S. patent application No. 61/163,132, filed on Mar. 25, 2009, the disclosure of which is incorporated herein by reference.

BACKGROUND

Internet advertising companies seek to find effective advertising methods to promote products and services to potential customers. One advertising method is displaying banner advertisements to recipients as part of a web page including images, text, and/or video promoting certain product and services. Banner advertisements are typically displayed to recipients to the web page hosting the banner, along with other information displayed by the content provider for the web page. A second internet advertising method is sending e-mail messages to potential customers. E-mail messages typically include images, text, and/or video promoting certain products and services, and generally allow more information to be conveyed than banners. E-mail messages that are not solicited by the recipient are much less effective as an advertising method than e-mails specifically requested by the recipient. Sending unsolicited emails raises the risks associated with non-encrypted electronic transmissions, spam filters, and the sharing of e-mail addresses without permission.

Both of the above advertising methods carry the risk on pushing numerous advertisements to potential customers that are not relevant or desired by the recipient. As a result, the potential customer builds an unfavorable image of the advertiser pushing such unwanted advertisements, or the vendor whose product and services are featured. For these reasons, certain vendors may be hesitant to participate in internet advertising. What is needed is a system and method of gathering a recipient's email address, or other preferred information delivery method, and sending targeted advertisements via this delivery method in response to the recipient's subsequent requests for information made through simple interactions with a banner advertisement while browsing the Internet.

DETAILED DESCRIPTION

Figure 1:
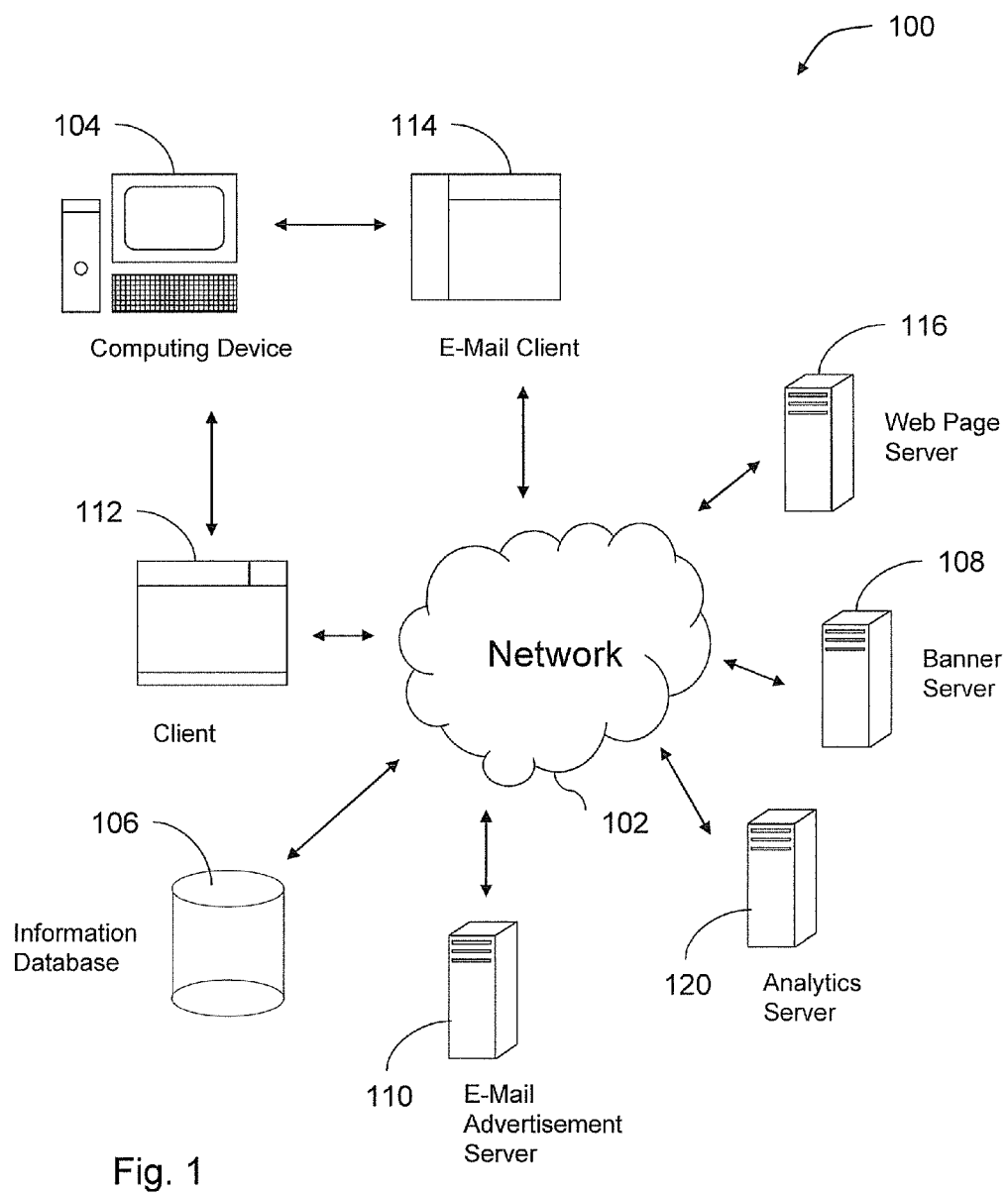
FIG. 1 is a diagrammatic illustration of a system according to an exemplary embodiment.

In an exemplary embodiment, as illustrated in FIG. 1, an advertising system 100 is shown. The advertising system 100 includes a network 102, which is preferably the Internet but may be a private intranet, a local area network (LAN), a wide area network (WAN), an adhoc network, cellular network including CDMA, GSM, and UMTS, a cable network. DSL network, fiber network, WiMAX network, or a combination of some or all of these networks, or any other suitable network. Communicating with and over the network 102 are a variety of servers, clients, and databases. The servers include a banner server 108, an e-mail advertisement server 110, a web page server 116, and an analytics server 120. Each of these servers may be implemented using hardware, software, or a combination of the two. The servers 108, 110, 116, 120 may be separate from one another, or some or all of them may share computing resources such as data storage, network access, processing resources, memory, operating systems, virtual servers, software libraries, and the like. The servers may be controlled by one entity, or they may be under the control of separate entities. For example, the web page server 116 may be controlled by a web page content provider, while the banner server 106, the e-mail advertisement server 108, and the analytics server 120 may be controlled by an Internet marketing company.

The analytics server 110 is operably coupled to, and in communication with the network 102. The analytics server 110 performs tracking of visitor interaction with banner advertisements and e-mail advertisements. The tracking data gathered by the analytics server 110 may be used by advertisers for business intelligence and financial analysis purposes, and to improve the delivery of advertising material.

The clients include a client 112 and an e-mail client 114. A visitor's or other recipient's computing device 104 is operably coupled to, and in communication with, the client 112 and the e-mail client 114. In an exemplary embodiment, the visitor's computing device 104 is any device capable of receiving and displaying a network communication over the network 102. In several exemplary embodiments, the visitor's computing device 104 is a personal computer, interactive display device, mobile device, or the like. In an exemplary embodiment, the client 112 is web browser software executing on a personal computer, for example Microsoft Internet Explorer, Google Chrome, Mozilla Firefox, Apple Safari, or any other suitable web browser.

The banner server 104 provides advertising content to the browser client 112 and/or the web page server 116. The banner server 108 may include multiple servers that provide redundant serving capacity for advertising content, and a server may be selected to provide advertising content to a particular recipient based on the geographic location of the recipient. In this way, the banner server 108 that is logically or physically nearest to the recipient can deliver the requested advertising content. The advertising content may be provided via hypertext transfer protocol or any other suitable protocol.

During operation of the system 100, the browser client 112 communicates with one or more of the servers. As one example, the browser client 112 may request a web page or other network communication containing advertising content from the web page server 116. In response, the web page server 116 provides the web page or other network communication and directs the browser client 112 to request advertising content from the banner server 108. The banner server 108 then sends a banner advertisement that allows the recipient to request additional information about the product or service being displayed on the banner. In an exemplary embodiment, this additional information is delivered to the recipient as an e-mail that the recipient has logged and registered through previous interaction with banner advertisements.

In an exemplary embodiment, the provider of the banner advertisement determines the content and format of the e-mail pushed to recipient based on the topic of the banner advertisement or preferences previously logged by the recipient. In this way, the system 100 allow the recipient to request or subscribe to delivery of information about specific products and services and to be matched with vendor that wishes to market those types of products and services.

In an exemplary embodiment, the provider of the banner advertisement generates a fee to be paid by the vendor of the product or service when the banner advertisement is shown to the recipient and/or when the recipient requests additional information. In an exemplary embodiment, the number of times the banner advertisement is shown and the number of times a recipient requests additional information is tracked and recorded by the analytics server 120.

In an exemplary embodiment, the analytics server 120 tracks recipient behavior and measures the visitor's and other recipient's response to a variety of banner advertisements. The results of tracking this behavior can be used by advertisers to predict the banner advertisement content that will most likely lead to a sale of a product or service. The tracking may also track the content of the web page or other network communication displayed in connection with the banner advertisement, self-reported information from the recipient, and records of previous purchases or Internet activities stored within cookies or other identifiers retained on the visitor's computing device 104. Advertisers may also use this behavior tracking to generate demographic profiles of recipients and to customize advertisement of products or services to future visitors based on those profiles.

Figure 2:
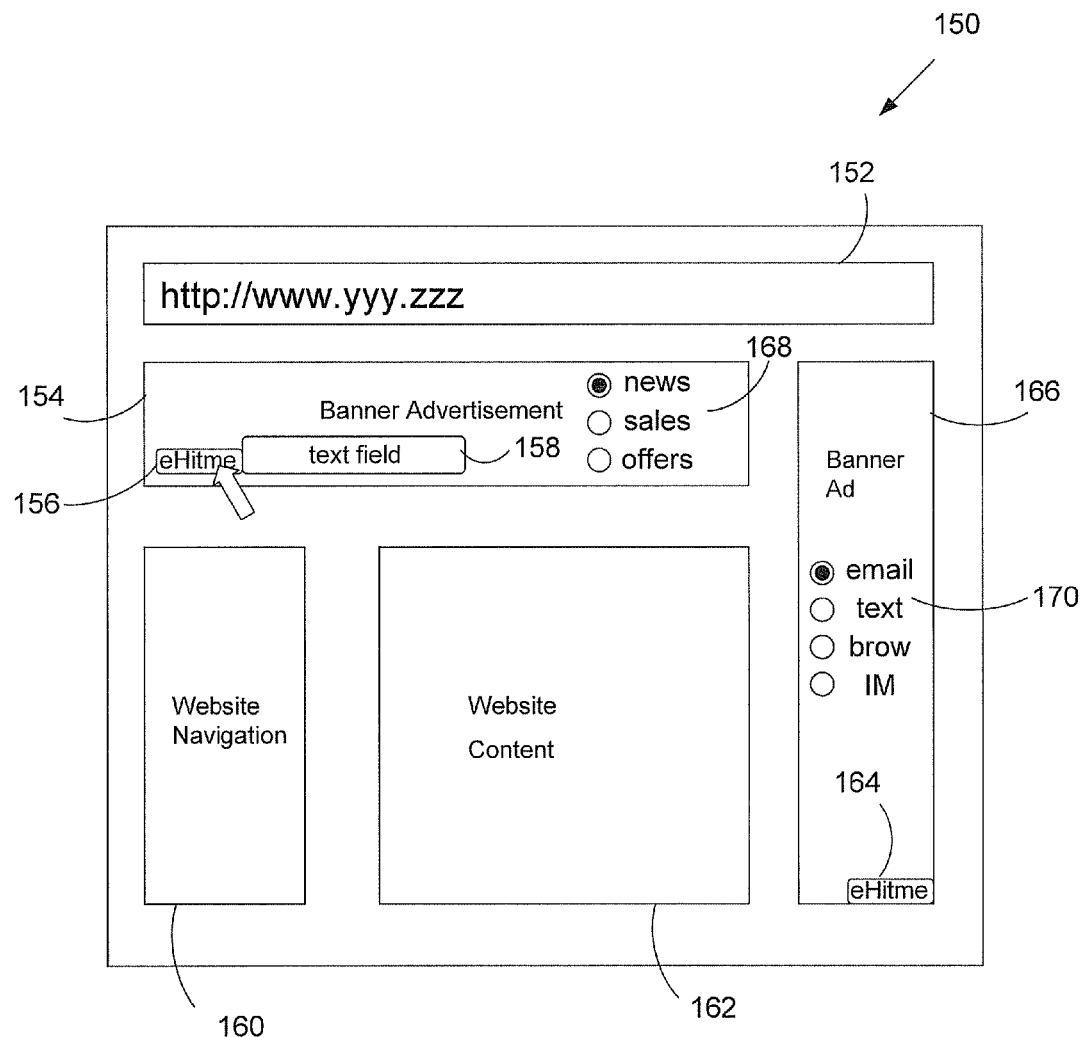
FIG. 2 is an illustration of a browser interface for interaction with a banner advertisement according to an exemplary embodiment.

FIG. 2 illustrates a browser interface 150 for interaction with banner advertisements 154 and 166 according to an exemplary embodiment. In an exemplary embodiment, the browser interface 150 is displayed on the visitor's computing device 104 by the browser client 112. The browser interface 150 includes an address bar 152, website navigation 160, website content 162, and banner advertisements 154 and 166. In an exemplary embodiment, the website navigation 160 and the website content 162 are provided by a third party owner of the web page associated with the domain name in the address bar 152.

Banner advertisements 154 and 166 can be displayed as a shape with any given dimensions, and may even change dimensions, but are typically rectangular areas anchored to a specific area on a web page or network communication. The banner advertisements 154 and 166 provide the visitor with a variety of information corresponding to various products from any number of vendors. In an exemplary embodiment, the banner advertisements 154 and 166 allow the visitor or other recipient to request additional information be delivered to the recipient by the advertiser, the vendor of the advertised products and services, or another third party. In an exemplary embodiment, the banner advertisements 154 and 166 supply information regarding sales, comparisons, new features, and other types of advertising messages.

In an exemplary embodiment, the banner advertisement 154 allows a recipient to request an email or other electronic communication be sent to the recipient's email address containing information about the product or service advertised. In an exemplary embodiment, recipients interact with banner advertisements 154 and 166 by interacting with interactive elements within the banner advertisements such as areas denoted by a logo 156 and 164. The interactive logos 156 and 164 can be resident in an existing banner of any size. When activated, the interactive logos 156 and 164 provide an interface option to allow a recipient to provide contact information or automatically send advertising or other information to the recipient's email address, or other contact method, without immediately delivering such information in the browser client 112.

Visitors and other recipients may activate interactive logos 156 or 164 by clicking, hovering over the interactive logos 156 or 164 for a predetermined time, or other known method or activation. In one embodiment, a visitor has not previous or interacted with the system 100. In this embodiment, activating interactive logo 156 causes an interface option, such as a text field 158, to appear.

Visitors and other recipients may type in contact information, such as an email address into a text field 158. In an exemplary embodiment, the recipient initiates an e-mail registration process by entering his email address into the text field 158. The recipient may then complete the e-mail registration process by selecting an opt-in option in a confirmation email that is sent to the recipient's email address. The recipient may be warned the confirmation email might be delivered to his spam box. After the recipient completes the e-mail registration process though the confirmation email; a cookie or other identifier is placed on the recipient's computer. The placement of cookie allows enhanced interaction between the recipient and the banner advertisement 154 and 166, as further described below.

In several exemplary embodiments, when the cookie other identifier is present and the recipient subsequently clicks or mouse over banner advertisement 154, code within the banner will trigger the delivery preferences 168 to give the option to the recipient to subscribe to regular periodic delivery of additional information regarding the subject of the banner advertisement 154. In an exemplary embodiment, the information preferences 168 in banner advertisement 154 include a radio button with types of additional information that the recipient may select, such as "newsletter," "sales," and/or "special offers."

In an exemplary embodiment, recipients have previously registered their email address through the online registration mechanism described above by way of text balloon 158 to activate the clickable logos 156 and 164. In this way, banner advertisements 154 and 166 deliver advertising or other information in a timely and unobtrusive manner without the recipient leaving the website hosting the banner advertisements 154 or 166 or otherwise interrupting the recipient's browsing.

In an exemplary embodiment, after completing the registration process and placing the cookie, the recipient may mouse over the banner advertisement 166 and select a delivery preference 170 to have the additional information delivered via text message, browser, or instant messaging service.

Figure 3:
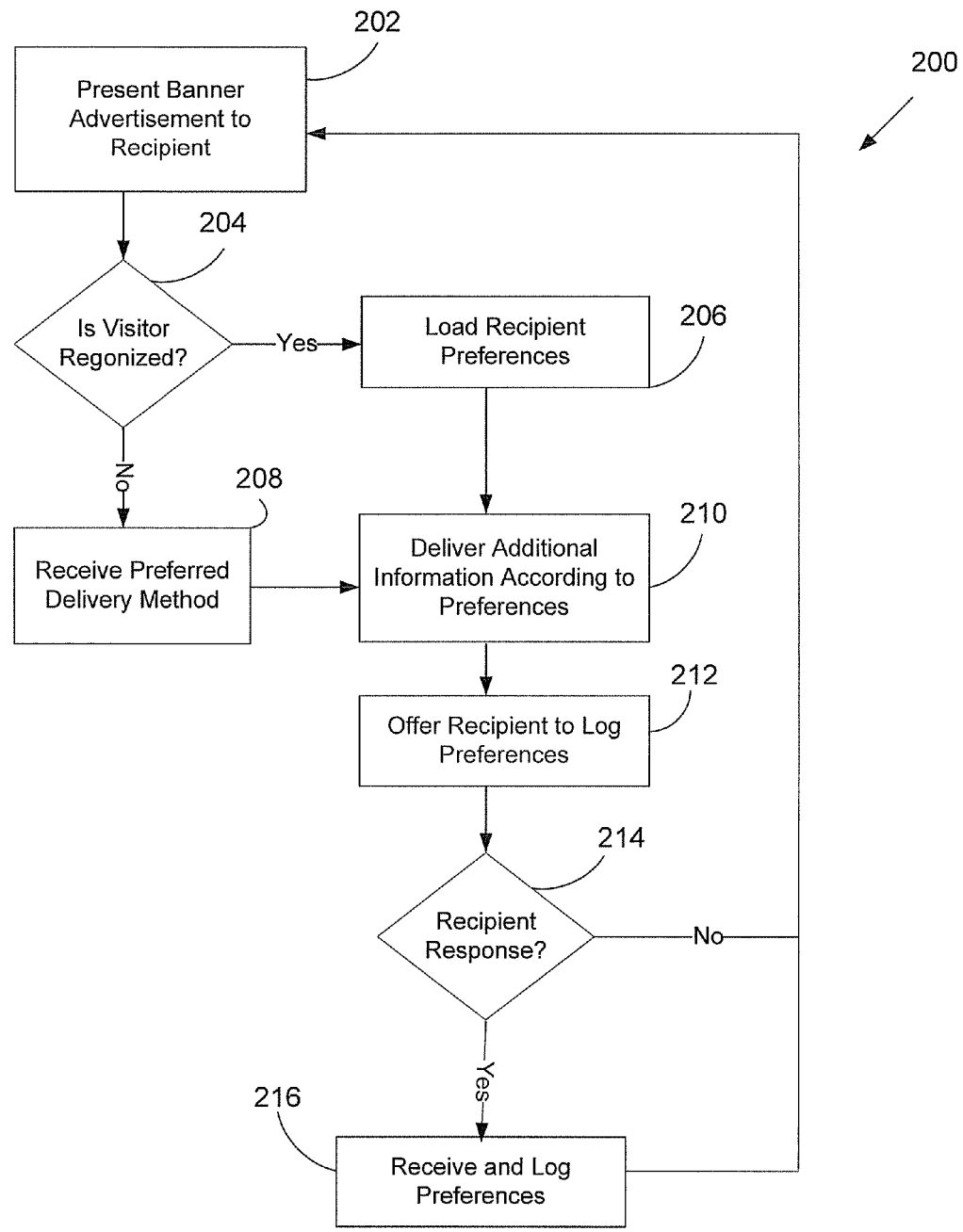
FIG. 3 is a flow chart illustration of an online advertisement delivery process conducted using the system of FIG. 1.

Referring now to FIG. 3, with continuing reference to FIG. 1 and FIG. 2, an example operational process 200 for delivering online advertisements is shown. At step 202, the banner advertisement 154 or 166 is presented to the recipient's browser client 112 by the banner server 108. At step 204, the banner server 108 determines whether or not the recipient can be recognized by a cookie or other identifier placed on the visitor's computing device 104.

If the recipient is recognized, the banner server 108 loads the recipient preferences from the visitor information database 106. If the recipient is not recognized, the recipient is presented an interface option, such as a text field 158, in the banner advertisement 154 or presented a delivery method preference selection 170 in the banner advertisement 166. At step 210, additional information is delivered to the visitor's browser client 112, the visitor's e-mail client 114, or via other means to the to visitor's computing device 104. In an exemplary embodiment, the recipient remains able to interact with the entire webpage displaying the banner advertisement 154 or 166 without pop-up of additional web pages, network communications, or other interruption.

At step 212, the recipient is given the option to enter delivery preferences for future deliveries of additional information. In an exemplary embodiment, these preferences include an option to subscribe to further e-mailings from certain selected vendors and advertisers. In another exemplary embodiment, these preferences include an option to subscribe to further e-mailings regarding certain selected types of products or services, irrespective of the vendor. In this way, the process 200 targets advertising to potential consumers who have opted-in to receive it.

At step 214, the process determines whether or not a response to the request for delivery preferences has been received. If a response is not received from the recipient, the process returns to step 202. At step 216, if the recipient enters delivery preferences, the preferences are received and stored in the recipient information database 106 and a cookie is placed on the visitor's computing device 104 so that the recipient will be recognized by the process 200 in the future.

Figure 4:
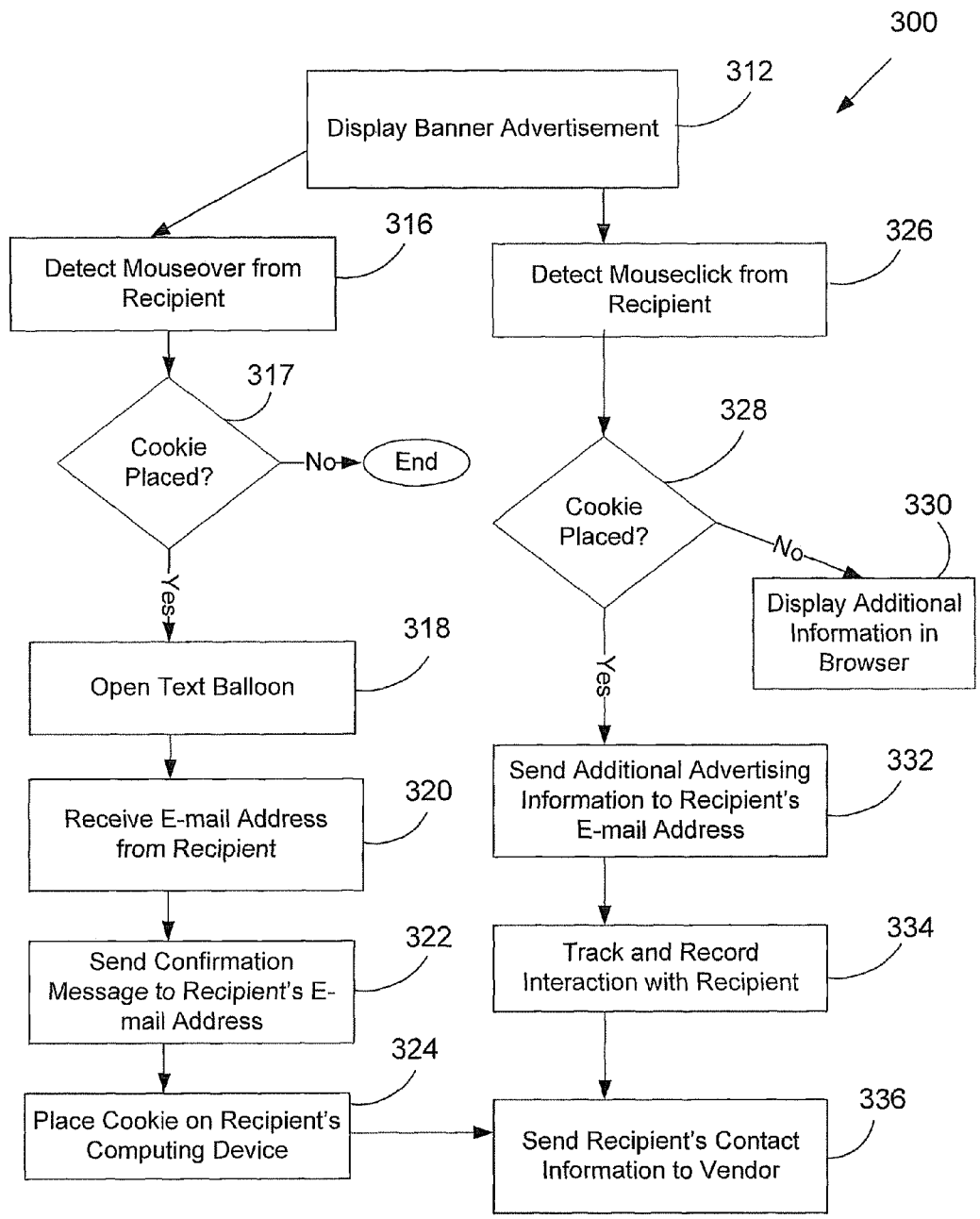
FIG. 4 is a flow chart illustration of an online recipient tracking process conducted using the system of FIG. 1.

Referring now to FIG. 4, with continuing reference to FIG. 1 and FIG. 2, an example operational process 300 for tracking recipients is shown. At step 312, a banner advertisement 154 or 170 is presented to the recipient's browser client 112 by the banner server 108 during a visit to a third party network communication provided by the web page server 116.

At step 316, a mouseover action on top of the banner advertisement 154 is detected by the banner server 108 or the web page server 116. At step 318, an interface option, such as the text field 158, is presented, opened or activated on the banner advertisement 154. At step 320, using his or her browser client 112, the recipient enters his or her email address into the text field 158. At step 322, the email advertisement server 110 send a confirmation email to the recipient's email client 114 using the entered email address.

The confirmation email may also contain an option to create a user profile for the recipient. In an exemplary embodiment, to create the profile, the recipient may enter additional preferences and contact information in the confirmation email, such as a name, a cellular phone number or an instant message screen name. In an exemplary embodiment, the use profile is stored on the visitor information database 106. In several exemplary embodiments, the user profile allows a recipient to opt-in to future updates concerning the advertised product or to allow future email marketing on related items that match the recipient's demographic or request history. In an exemplary embodiment, once a recipient has created a profile, the recipient can manage the user profile by interaction with another website manages by the advertiser or a third party. In an exemplary embodiment, management includes changing privacy and contact preferences. Subject to the preferences set on the user profile, the recipient's contact information is sent to any number of advertisers or vendors.

The website used to manage the recipient's user profile may also record the types of information sent by advertisers to the recipient, or act as a delivery service for said information. The cookie and/or website may also track and record the number of successful clicks and click-through percentage for banner advertisements 154 and 166 in order to send relevant information to vendors. In an exemplary embodiment, the vendor of the product or services pays the vendor based on the interactions of recipient with the banner advertisements 154 and 166.

At step 324, a cookie or other identifier is placed on the visitor's computing device 104 contain unique identifying information for that recipient.

At step 326, a mouseclick action on top of logo 156 or 164 within the banner advertisement 154 or 166 is detected by the banner server 108 or the web page sever 116. At step 328, the banner server 108 determines whether or not a cookie or other identifier containing unique identifying information for the recipient has been placed on the visitor's computing device 104. If no cookie is present, additional information regarding the subject of the banner advertisement 154 or 166 is displayed to the recipient's browser client 112.

At step 332, if a cookie is present on the visitor's computing device 104, the additional advertising information is sent to the e-mail client 114. At the step 334, the recipient's request for additional advertising information is recorded by the analytics server 120. In an exemplary embodiment, the data recorded by the analytics server 120 is associated with the unique identifying information stored in the cookie, allowing recipient's individual interactions with banner advertisements 154 and 166 to be tracked. At step 336, this recording and recipient tracking data gathered by the analytics server 120 may be shared with third party vendors or other advertisers. In an exemplary embodiment, the recipient may select which vendors have access to this data by adjusting settings in his or her user profile.

Figure 5:
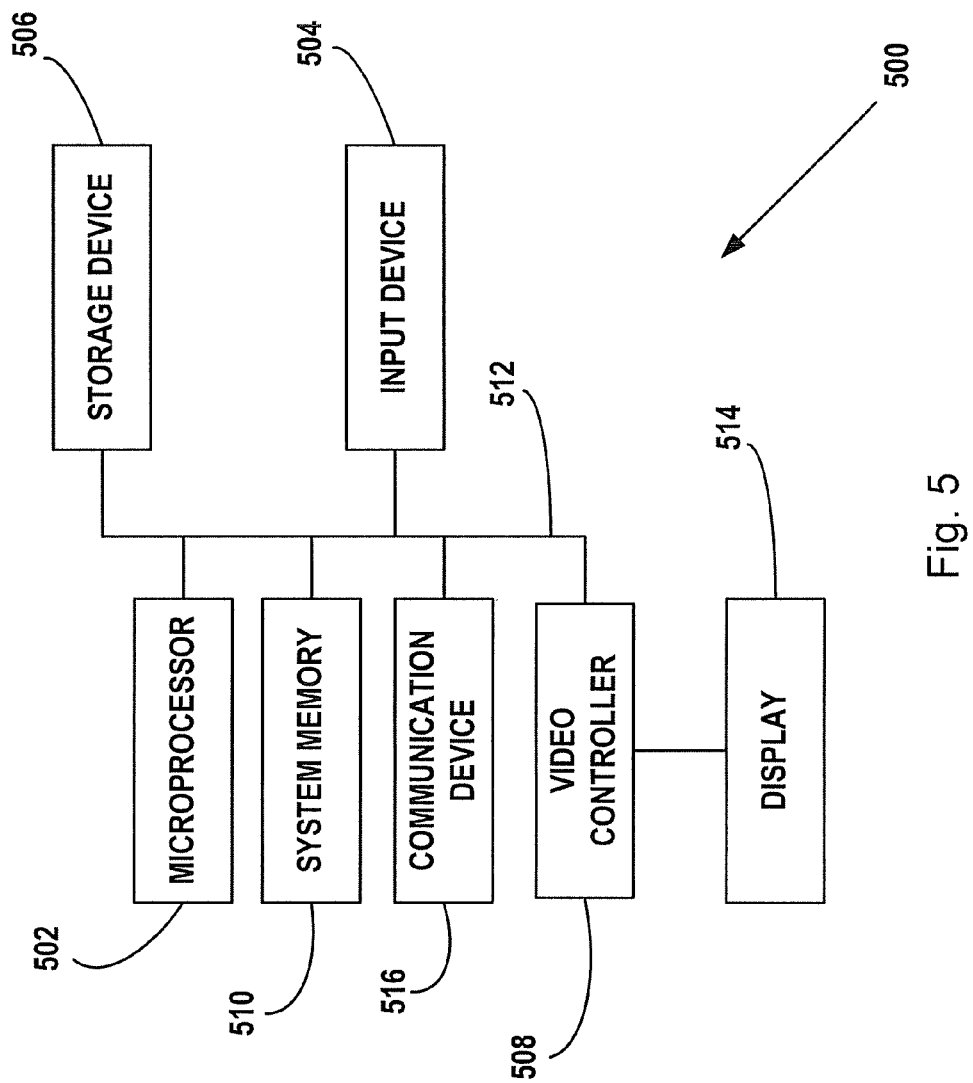
FIG. 5 is a diagrammatic illustration of a node for implementing one or more exemplary embodiments of the present disclosure.

Referring to FIG. 5, an illustrative node 500 for implementing one or more embodiments of the present disclosure is depicted. Node 500 includes a microprocessor 502, an input device 504, a storage device 506, a video controller 508, a system memory 510, and a display 514, and a communication device 516 all of which are operably coupled to one another by one or more buses 512. The storage device 506 could include any type of computer readable medium. The storage device 506 could be a floppy drive, hard drive, CD-ROM, optical drive, or any other form of storage device. In addition, the storage device 506 may be capable of receiving a floppy disk, CD-ROM. DVD-ROM, or any other form of computer-readable medium that may contain computer-executable instructions. Further, the communication device 516 could be a modem, network card, wireless chipset, or any other device to enable the node to communicate with other nodes. It is understood that any node could represent a plurality of interconnected (whether by intranet or Internet) computer systems, including without limitation, personal computers, mainframes, PDAs, and cell phones. In several exemplary embodiments, the node 500 and/or one or more components thereof, including one or more of the microprocessor 502, the input device 504, the storage device 506, the video controller 508, the system memory 510, the display 514, and the communication device 516, and/or any combination thereof, are distributed throughout the system 100 and/or one or more components thereof, and/or any combination thereof.

In an exemplary embodiment, the visitor's computing device 104, and each of the servers 108, 110, 116, and 120 is a node 500.

The system 100 includes at least hardware capable of executing machine readable instructions, as well as the software for executing acts (typically machine-readable instructions) that produce a desired result. In addition, the system 100 may include hybrids of hardware and software, as well as computer sub-systems.

Hardware generally includes at least processor-capable platforms, such as client-machines (also known as personal computers or servers), and hand-held processing devices (such as smart phones, portable computing devices, or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example. Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server. Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code.

The system 100 may be designed to work on any specific architecture. For example, the system may be executed on a single computer, local area networks, client-server networks, wide area networks, internets, hand-held and other portable and wireless devices and networks.

The visitor information database 106, and any other database described, may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

A method has been described that includes displaying to a recipient an advertisement associated with a first party that contains an interactive element displayed within the advertisement in a network communication associated with a second party, displaying an interface option within the advertisement as a result of an interaction by the recipient with the interactive element, receiving contact information in the interface option from the recipient, and storing the contact information in a database.

A method has been described that includes displaying a second interface option within the advertisement, wherein the second interface option displays a delivery preference selectable by the recipient, receiving the delivery preference in the second interface option, and storing the delivery preference in a database.

A method has been described that includes displaying, to the recipient, a second advertisement associated with a third party that contains a second interactive element within the second advertisement in a second network communication associated with a fourth party, receiving an input from the recipient in the second interactive element, wherein the recipient remains able to interact with the entire portion of the Web page, querying a cookie or other identifier stored on a computer associated with the recipient, identifying an email address associated with the cookie, and sending advertising information to the email address.

A computer readable medium has been described that includes a plurality of instructions including instructions for displaying to a recipient an advertisement associated with a first party that contains an interactive element displayed within the advertisement in a network communication associated with a second party, instructions for displaying an interface option within the advertisement as a result of an interaction by the recipient with the interactive element, instructions for receiving contact information in the interface option from the recipient, and instructions for storing the contact information in a database.

A system been described that includes a an advertisement associated with a first party on a network communication associated with a second party, an interactive element displayed within the advertisement as a result of an interaction by the recipient with the interactive element, an interface option within the advertisement to receive contact information from the recipient; and a database to store the contact information.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method of online advertising, comprising:
providing an advertisement associated with a first party for display in a network communication delivered to a computing device of a recipient during a browsing session, wherein the advertisement contains an interactive element displayed within the advertisement, and wherein the network communication is associated with a second party different than the first party;
receiving an indication that the recipient activated the interactive element displayed within the advertisement;
determining, in response to the receiving the indication, whether an identifier containing unique identifying information about the recipient is present on the computing device;
if the identifier containing unique identifying information about the recipient is not present on the computing device:
  causing a text field to be displayed in at least a portion of the advertisement;
  receiving contact information inputted into the text field by the recipient;
  generating a user profile associated with the recipient based on the contact information; and
  causing an identifier associated with the user profile to be stored on the computing device of the recipient; and
if the identifier containing unique identifying information about the recipient is present on the computing device:
  retrieving a user profile associated with the recipient from a visitor information database using at least a portion of the identifier, wherein the user profile comprises at least delivery method preferences and demographic information;
  retrieving additional information associated with the advertisement based on at least a portion of the user profile associated with the recipient;
  delivering the additional information to the recipient based on the delivery method preferences, the delivering being performed without interrupting the browsing session of the recipient; and
  recording the activation by the recipient of the interactive element as recipient tracking data in an analytics server, the recipient tracking data being associated with the unique identifying information about the recipient.

2. The method of claim 1, further including:
causing an interface option to be displayed in at least a portion of the advertisement, wherein the interface option includes a plurality of delivery methods selectable by the recipient;
receiving an indication of at least one delivery method selected by the recipient; and
updating the delivery method preferences in the user profile of the recipient to reflect the at least one delivery method selected by the recipient.

3. The method of claim 1, further including:
causing a plurality of selectable delivery preference options to be displayed in at least a portion of the advertisement, the plurality of selectable delivery preference options including types of additional information available for delivery to the recipient;
receiving an indication of at least one delivery preference selected by the recipient; and
updating the user profile of the recipient to reflect the at least one delivery preference selected by the recipient.

4. The method of claim 1, further including:
providing a further advertisement associated with a third party for display in a further network communication delivered to the computing device of the recipient, wherein the further advertisement contains a further interactive element displayed within the further advertisement, and wherein the further network communication is associated with a fourth party different than the third party;
receiving an indication that the recipient activated the further interactive element displayed within the further advertisement;
if the identifier containing unique identifying information about the recipient is present on the computing device:
  retrieving the user profile associated with the recipient from the visitor information database using at least a portion of the identifier;
  retrieving further additional information associated with the further advertisement based on at least a portion of the user profile associated with the recipient;
  delivering the further additional information to the recipient based on the delivery method preferences, the delivering being performed without interrupting the browsing session of the recipient; and
  recording the activation by the recipient of the further interactive element as recipient tracking data in the analytics server.

* * * * *